May 19, 1953   K. F. RUSSELL   2,639,003
METHOD OF ASSEMBLING AN AIR FILTER PANEL
Filed May 19, 1947
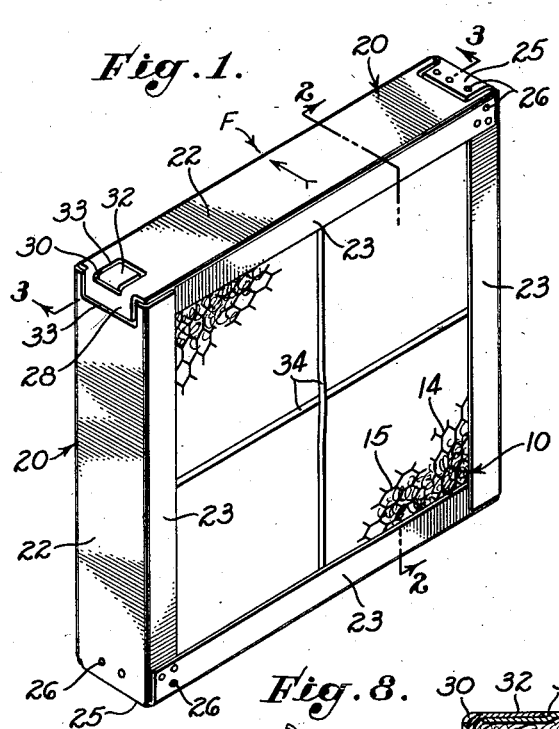
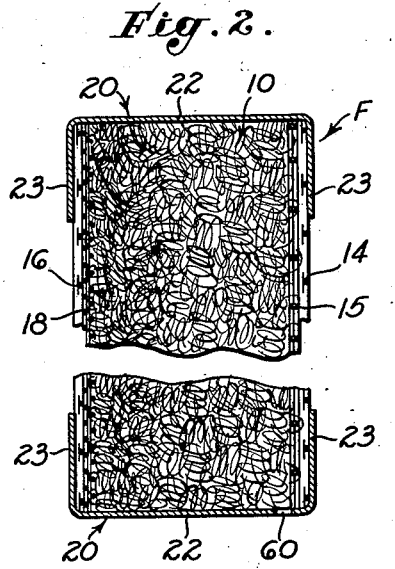
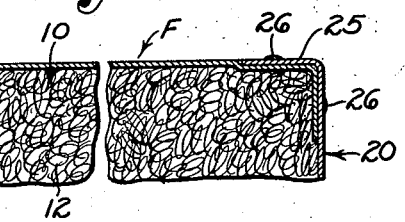
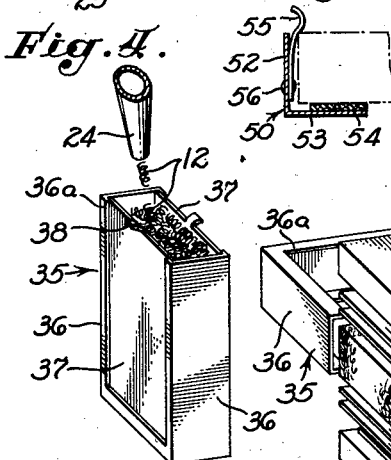
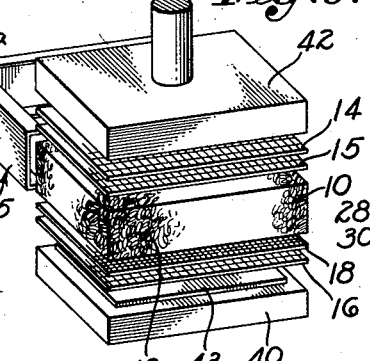
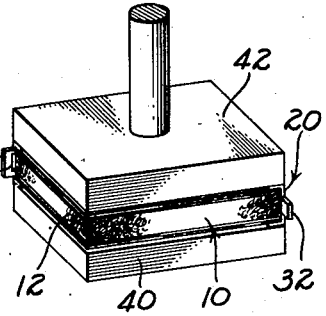
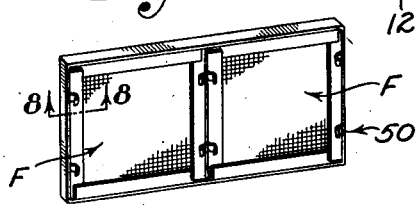
INVENTOR.
KENNETH F. RUSSELL
BY HIS ATTORNEYS.
HARRIS, KIECH, FOSTER & HARRIS Patented May 19, 1953

2,639,003

UNITED STATES PATENT OFFICE 2,639,003

METHOD OF ASSEMBLING AN AIR FILTER PANEL

Kenneth F. Russell, Claremont, Calif., assignor to Herman H. Garner, Claremont, Calif.

Application May 19, 1947, Serial No. 748,916

2 Claims. (Cl. 183—47)

This invention relates to apparatus adapted for air filtering and flame arresting, and it is applicable especially to use in air conditioning units and in air filtering systems including air ducts where it is possible for fire to break out.

It is common to use filtering elements in air conditioning and ventilating systems, and especially where fans and the like are employed to move conditioned air into rooms where it is used or to withdraw contaminated air therefrom. The common air conditioning systems are examples of the first instance, and the withdrawal of air from kitchens and other establishments where grease fumes and undesirable vapors are generated is representative of the other instance. In the latter case, where such fumes and vapors are drawn into air ducts, and especially where stoves with open flames are employed, fires frequently break out and the flames pass into the ventilating air ducts.

One object of the present invention is to produce an air filter, preferably in panel form, which may be easily installed for filtering air in air conditioning apparatus, and may be also employed for filtering air passing into ventilating systems.

A further object is to provide such a removable filter panel that is both highly efficient and, at the same time, may be readily cleaned in solvent or the like and returned for reuse.

A still further object is to employ a filter of the indicated type that will not only filter undesirable constituents from the air, including the collection of grease fumes and the like, but will at the same time serve as a flame arrester in the event that fire breaks out.

A particular object is to produce a form of air filter panel which is especially adapted to remove large particles of contaminating material in air in the zone of the filter which the air first contacts, smaller and smaller particles being successively removed as the air passes from the inlet or upstream side to the outlet or downstream side. A particular object in this respect is to provide a filter pack or filter body such that during the steps of assembly the inlet side of the filtering element is less tightly packed than the intermediate zone in order to provide a desirable locus for the entrapment of larger particles which contaminate the air, and whose opposite face is more tightly packed than the intermediate zone so that fine particles in the air about to be discharged from the filter element are caught in the resultant more tightly packed region which thereby constitutes a locus for the entrapment of such finer contaminating impurities in the air.

A further object of the invention is to provide a panel filter of the indicated character wherein freedom of relative movement of spring members is substantially eliminated and wear with consequent fracture is largely avoided, thereby greatly prolonging the life of the filter element.

Another object of the invention is to provide a filter element, which, when assembled in operative position, cannot be jarred into a lesser volume which would leave voids and result in air channeling as the air passes therethrough.

A still further object of the invention is to provide a filter having a maximum contact surface evenly distributed throughout the body, there being a more dense area at the face of the filter on the downstream side to facilitate the removal of finer impurities in the air, and a relatively coarse area on the upstream side whereby to provide for removal of larger solid particles such as lint and small pieces of vegetation without clogging, the finer impurities passing deeper into the screen before being removed.

Other objects and features of this invention will become apparent to those skilled in the art to which it pertains upon reference to the following specification and accompanying drawing wherein one embodiment of the invention is illustrated and described by way of example.

In the drawing:

Fig. 1 shows in perspective a completely assembled panel filter constructed in accordance with this invention and adapted to serve both as an air conditioning filter and as a flame arresting filter;

Fig. 2 is a fragmentary vertical section taken on the line 2—2 of Fig. 1;

Fig. 3 is a fragmentary vertical longitudinal section taken on the line 3—3 of Fig. 1;

Fig. 4 illustrates a step in the method of building up the resilient coil filter element which constitutes the filter body within the completed panel filter, this figure also showing equipment employed for the purpose;

Fig. 5 indicates a series of successive steps employed in the assembly of the panel filter;

Fig. 6 illustrates the step of compressing the resilient coil body which forms the filter element and also the step of assembling about such filter body one portion of the housing which retains the filter parts in assembled relationship;

Fig. 7 illustrates how a plurality of completed panel filters may be removably mounted in a supporting frame; and Fig. 8 illustrates the employment of spring clip means for removably retaining the panel filter in the supporting frame of Fig. 7.

The assembled panel filters as a whole are indicated in the drawing at F, such panel filters F comprising a cellular filter body or core 10 which is composed of a multiplicity of linked helical coils 12 later to be described, the opposite sides of the filter body 10 being confined by a plurality of screens 14, 15, 16, and 18, the edges of the filter body 10 and the screen being confined by a plurality of channel shaped frame members 20, which, for the square structure shown, are four in number. Each of these frame members 20 has a main web 22 which is provided at its edges with flanges 23 whereby the channel structure is formed.

At the upstream or inlet side of the filter body 10, the two screens 14 and 15 are of relatively coarse mesh and are relatively strong and rigid. The mesh is of such size as to provide openings into which some of the convolutions of the adjacent helical coils 12 will project, and through which some of the hooked ends of the coils 12 pass sufficiently to engage over the wires or bars of the screens. In practice it may be desirable to employ ordinary expanded metal of such a mesh as to cooperate with the coils 12 in the indicated manner. As indicated in both Figs. 1 and 2, the outer screen 14 is staggered with relation to the inner screen 15 so that the wires or bars of the screen 14 will overlie the central portions of the openings in the screen 15 and thereby restrict the projection of the convolutions of the coils 12 so that they do not extend through the openings in the outer screen 14. Such projection of the convolutions of the helical coils 12 permits the intake side of the filter body to be relatively coarse as to its cellular structure and to provide relatively large pores for the reception of the larger contaminating particles in the air being filtered.

At the opposite side of the filter body 10, that is, on the downstream or discharge side thereof, the outer screen 16 is also a relatively heavy, coarse screen and may be of the same construction as that of the screens 14 and 15, that is expanded metal, if desired. This heavy, coarse screen is required to provide proper positioning and resistance to the respective side of the filter body, the inner screen 18 being of fine mesh and normally being in the form of the ordinary fly screen which is relatively weak and yielding as compared with the coarse screen 16. As best seen at the left of Fig. 2, the mesh of the screen 18 is very much smaller than the mesh of the coarse screen or expanded metal 16, and is in fact of such fine mesh that no portions of the convolutions of the coils 12 will project therethrough, although adjacent hooked ends of the wire forming the coils 12 will in some instances hook around the meshes 18 in much the same way that the hooked ends of the coils engage around the bars of the screens 14 and 15. This hooking of the ends of the coils serves to tie the filter body 10 to the screens and assists in maintaining the compact coherent mass. Incidentally, the hooked ends of these coils throughout the mass interengage or interlink with the convolutions of the adjacent coils, thereby causing the entire mass to be hooked together and providing a body free from shifting of adjacent coils with respect to each other. However, since the coils are formed from light, spring wire, which is a hard, drawn, low carbon wire and is normally 0.011 inch in diameter, it is readily compressible during assembly, and this compression, together with additional agitation, if desired, serves to insure the formation of the mentioned coherent mass resultant from the interlinking of the hooked ends of the coils with the adjacent convolutions. To insure this linking, the ends of the coils are not closed, but are left open when they are manufactured.

The production of the cellular filter body 10 from the helical coils 12 is illustrated in Fig. 4, where the open ended coils 12 are shown as being dropped from a coil forming machine through a nozzle or small chute 24 whence they drop into a receptacle, later to be described, a certain amount of the interlinking of the open hooked ends with adjacent convolutions taking place as the descending coils fall upon those which have already entered the receptacle. In order to effect further interlinking, the mass of coils so collected is jarred, as a result of which the hooked open ends further interlink with convolutions of adjacent coils, and there is further intermeshing of adjacent convolutions.

To promote the interlinking and intermeshing, the coil spring mass formed as just described is compressed to a substantially smaller dimension, as presently to be described, the mass being used in such compressed condition and smaller volume, this being the condition indicated in Figs. 1, 2, and 3, and also in Fig. 6. Such compression not only produces the desired interlinking and intermeshing, but it also places the coils under stress so as to eliminate freedom of relative movement of contiguous portions of the formed wire or coils under the load conditions encountered in use.

Since the fine wire of which the coils are formed is a resilient spring wire, the interlinked and intermeshed filamentous cellular filter body possesses considerable resilience, and since the mass is placed under stress by the compression so that nearly all freedom of relative movement is eliminated, appreciable wear of the spring wires at their points of contact is almost entirely eliminated and the life of the mass is thereby correspondingly prolonged. In addition to the elimination of wear, there is also an entire elimination of shift of the various filaments and coils, due not only to the interlinking and intermeshing but also due to the engagement of hooked ends of the coils at the sides of the mass with the supporting screens 14, 15, 16, and 18. Since there can be no shift within the filter body, there is no channeling, and the air stream passing therethrough is consequently uniformly distributed.

Where the term "resilient" is used herein to refer to the coils or to the wire from which the coils are made, this is intended to signify spring or drawn wire inherently possessing the required resilience and resistance to permanent deformation. This is to distinguish the wire coils of this construction from relatively non-resilient masses, such as steel wool, copper wool, and the like. Similarly, where the term "coil" is employed, it is intended to include helical formations, spiral formations, and other three-dimension yielding formations.

With respect to the framework 20 which retains the filter body 10 and its supporting screens 14, 15, 16, and 18, this is made up of four sections as above indicated, each section having the mentioned main web 22 and flanges 23. These are formed preliminarily as two right angled or L-shaped sections adapted to be brought together during the operation of assembling the filter panel and then connected to complete the panel construction, these L-shaped sections thus being formed as two pairs of webs 22. The adjoining ends of the webs 22 of each pair are provided with tongues 25 which are bent at right angles in order to overlie the adjacent end portions of the other web 22 in each instance, and these tongues 25 are then respectively welded or otherwise rigidly attached. Similarly, the adjacent ends of the respective flanges 23 are interfitted, as best indicated in Fig. 1, and these are also welded or otherwise permanently attached. As indicated, spot welding 26 is employed both for the purpose of affixing the tongues 25 and for affixing the overlapping ends of the flanges 23 together. The opposite ends of the webs 22 of each L-shaped section are so constructed as to adapt them to be bound together as the last step of the assembly operation. For this purpose, the respective end of one of the webs 22 is provided with a right angularly bent tongue 28, similar to the tongue 25, and this tongue is provided with a narrow slot 30 on the line of bend, such slot 30 being adapted to receive a narrow tongue 32 formed on the adjacent end of the other cooperating web 22. The tongue 32, after being passed through the respective slot 30, is bent over at right angles to maintain the joint thus formed. Preferably, the adjacent portions of the webs 22 are countersunk as indicated at the upper left of Fig. 1 and designated 33 whereby to provide a flush outer surface. As shown in Fig. 1, the overlapping of the flanges 23 is preferably staggered so that one end of each flange 23 is positioned within the adjacent flange 23 and the other end is positioned without the adjacent end of the corresponding flange 23. Thus one end of each flange is retained within the end of another flange and its other end is disposed outside the end of a third flange to aid in retaining the latter.

Respecting dimensions of the various portions of the present filter panel, the coil springs 12 with their hooked open ends may be about one-fourth to five-sixteenths inches in diameter and may be about one inch to one and one-quarter inches long, these being formed from the small gauge spring wire above designated as having a diameter of 0.011 inch. With coils of such dimensions, coarse screens 14 and 15, such as expanded metal screens, may have openings of about one-quarter inch by three-eighths inch, such openings permitting a sufficient number of convolutions of the coils on the upstream side to project somewhat into the openings to avoid undesired compacting as previously explained, the crosslaid screen 14 satisfactorily controlling such projection of the convolutions as might be undesired. The coarse screen 16 on the downstream side may have openings of the same dimensions, but since it is provided to reinforce the fly screen 18, such dimensions might vary considerably. The fly screen 18 is of a common conventional construction and has square mesh running about eighteen to the inch, thereby preventing any projection of the convolutions therethrough and producing the required compacting on the downstream side. However, such mesh permits an adequate number of the open hooked coil ends to project therethrough so that tying of the coiled mass to the fly screen is assured. Filter panels so constructed may vary considerably in size; for example, they may be of one inch to two inches in thickness or even thicker, and may vary from ten inches square up to as much as forty inches square. Where the larger sizes are employed it may be necessary to employ a sufficient number of stout crosswires 34 to reinforce the screens and to prevent outward bulging of their central regions.

*Assembling*

As indicated in Fig. 4, and as previously outlined, the cellular filter body 10 is formed by dropping coils 12 from a coil making machine through the discharge chute 24 into a receptacle of appropriate size. As shown in Fig. 4, this receptacle 35 comprises a channeled U-shape frame 36 having opposite sides or walls 37 adapted to slide within the flanges 36a of the channel construction, these sliding sides 37 having manipulating pieces 38.

With the receptacle 35 in position beneath the chute 24 as indicated, the coils drop consecutively into the chamber provided between the sliding walls 37, the open hooked ends of the various coils interlinking with various convolutions of the other coils, with the result that a coherent interlinking and intermeshing resilient cellular body is produced. By jarring the receptacle 35 after it has been filled with the coils 12, further interlinking and intermeshing are produced, and if the coil mass within the receptacle 35 be removed its elements will cling together and the rectangular form will be maintained.

Having filled the receptacle 35, any appropriate cover may be applied to the top of the receptacle if desired, and the whole placed in an assembly press. This press comprises a bed member 40, Fig. 5, and an upper reciprocating parallel member 42 thereabove. The upper face of the bed member 40 is rabbeted out at its edges to provide an upstanding central portion 43 which will fit within the flanges 23 at one side of the framework 20, the under side of the reciprocating upper press member 42 being similarly formed to engage within the flanges 23 at the opposite side of the framework 20. The bed member 40 is prepared by laying upon the upstanding portion 43 the coarse screen 16, and upon the screen 16 there is then laid the fly screen 18. The receptacle 35 is then placed upon the screens 16 and 18, the top cover removed if one has been employed, and the sliding side walls 37 are withdrawn by means of the manipulating pieces 38. When the side walls 37 are removed, adjacent open ends of the coils will enter corresponding meshes of the screen 18. The coil body 10 is then held in place by the operator and the frame 36 is withdrawn as indicated as in Fig. 5. This leaves the screens 16 and 18 and the coil body 10 resting upon the upstanding portion 43 of the bed member 40. The coarse screens 14 and 15 having been laid upon the upper side of the coil body 10, or having been laid upon the upper side wall 37 before its removal, the upper member 42 of the press is caused to descend to produce the desired amount of compression in the coil body 10. This compression may reduce the coil body from two inches in thickness down to an operative thickness of about one and one-half inches, for example. The resultant position of the press members 40 and 42 is such that the rabbeted portions on the inner faces of these members will readily receive the flanges 23 of the two L-shaped sections of the framework 20, these two sections being moved into position from opposite directions, and one of them being shown in position in Fig. 6. When the other section is moved into position, its narrow tongue 32 is passed into the slot 30 at the end of the wide tongue 28 in the one section of the frame; similarly, the narrow tongue 32 of the one section of the frame is received in the corresponding slot 30 of the frame section being placed. Thereupon both of the narrow tongues 32 and both of the wide tongues 28 are bent over at right angles so as to seat in the countersunk portions 33 of the webs 22 and thereby clinch the portions of the frame in fixed, assembled position. Upon lifting the upper press member 42 the completely assembled filter panel is removed.

For the purpose of mounting a plurality of the finished panel filters F in operative position in an air duct or air conditioning apparatus or in a ventilating system, any type of supporting frame 50 as indicated in Figs. 7 and 8 may be used. The frame 50 as shown comprises a rectangular construction having capacity for as many of the panel filters as desired. In general, it comprises a flat peripheral frame member 52 having a peripheral back wall 53 which may carry an appropriate cushion 54. At various positions around the frame member 52, there is provided a plurality of springs 55 which are riveted in place as shown at 56, and are so constructed as to retain the framework 20 of the respective panel filters F when snapped into position.

Operation

When panel filters of this invention are to be used in air conditioning systems for cleaning air entering the same, the cellular filter body 10 is given a coating of a suitable adhesive material to hold dust particles and other contaminating solids in the air being passed through the filter. Such a coating may be a light mineral lubricating oil such as an SAE 30 grade, or might be a somewhat heavier grade. For this purpose mineral oils have been found highly efficient. The coating may be effected, and preferably is accomplished, by dipping the entire filter panel into a bath, any excess oil being allowed to drain out of drain apertures 60 provided at the bottom of the unit as seen at the bottom of Fig. 2. When the filters are used in ventilating systems where they may serve as flame arresters, a coating of adhesive is unnecessary. This is particularly true when they are installed in restaurants and cafeterias over cooking ranges and other locations where food is being prepared. In connection with such uses the filters collect grease fumes, lint, and other materials which are thereby prevented from passing into the ventilating systems and coating the walls of the ducts. Thus, these filters serve to collect grease fumes and the like which in turn trap lint and dust and prevent passage of these objectionable materials into the ducts where they would otherwise serve to assist the propagation of flame should a fire break out in the system. Further than this, these filters will act as efficient means for preventing passage of flame into the ducts. Consequently, the breaking out of fire and its passage into ventilating systems are almost entirely eliminated, inasmuch as flames which may break out over a stove cannot enter the ventilating flues or ducts.

Whether the filters be employed in air conditioning systems or in ventilating systems, dust particles and other contaminating material in the air entering the filters encounter the mass of interlocked and intermeshed springs, the largest materials being entrapped in the upstream side of the body after passing through the coarse screens 14 and 15. Since the springs constituting the cellular filter body are uniformly packed and cannot shift in use, it is impossible for the air to channel, and, as a consequence, air distribution is uniform. In addition, the spring pattern within the filter body sets up a turbulent air action that insures maximum impingement of the dust particles on the oily surfaces. Also, this coil-spring pattern keeps restriction of the air flow at a minimum, so that the filter will handle an unusually heavy load. As the air, from which the coarser particles of the contaminating material have been removed by the upstream side of the filter, continues to the downstream side of the filter, it passes through the compacted zone against the fine screen 18 wherein the passages are smaller, the turbulence increases, and the finest dust particles are caused to impinge upon the coated wire surfaces and to be retained thereon. Thus, the cleaning action progresses with respect to contaminating particles of various sizes as the air passes from the upstream side of the filter which is relatively open to the more compacted downstream side adjacent the screen 18.

It has been found that this type of filter provides for extremely uniform distribution of air, and also results in an exceptionally low air restriction. In view of the uniform distribution and absence of channeling, and further in view of the highly tortuous and cellular nature of the filter body it has an extremely high dust holding capacity while at the same time preserving its high capacity for air flow. Due to the fact that the springs are held under compression and cannot shift under vibrations produced in the system by fans and other vibrating equipment, the springs do not wear appreciably at their contact points, and therefore breakage is extremely small, being in fact practically nonexistent. Consequently, the life of this panel filter is unusually long.

When a filter has become unduly contaminated, it may be readily rejuvenated by washing in appropriate solvent which will remove the oil used to coat the wires initially, and to remove grease and the like which has accumulated thereon in a ventilating system. Upon re-oiling where used in air conditioning systems, the filters may be replaced for further use; similarly, after cleaning they may be restored to their place in ventilating systems.

Since variations of the generic invention herein disclosed will occur to those skilled in this art, it is intended to cover all such modifications as fall within the scope of the claims.

I claim as my invention:

1. A method of assembling a filter panel comprising: dropping relatively short resilient coil springs to form a coil body having opposite substantially flat faces; placing screen means in a press; depositing said coil body upon said screen means with one flat face of said coil body engaging said screen means; placing other screens upon the opposite face of said deposited coil body; applying pressure to said other screen means to compress said coil body; placing frame members around the edges of said coil body and said screen means to engage the outside portions at the edges of the screen means and retain said screen means and coil body in assembled relation; and securing said frame members in operative position.

2. A method as in claim 1 wherein a receiver is provided with removable slidable sides, said receiver being placed upon the screen means in the press, the other screen means being placed upon the receiver, said slidable sides being withdrawn to permit the screens to contact the coil body, and the receiver being then withdrawn.

KENNETH F. RUSSELL.

References Cited in the file of this patent

UNITED STATES PATENTS

| Number | Name | Date |
|---|---|---|
| 1,450,951 | Cruyt | Apr. 10, 1923 |
| 1,560,790 | Jordahl | Nov. 10, 1925 |
| 1,566,607 | Jordahl | Dec. 22, 1925 |
| 1,598,097 | Mathis | Aug. 31, 1926 |
| 1,841,347 | Tuttle | Jan. 12, 1932 |
| 1,886,671 | Gottschalk et al. | Nov. 8, 1932 |
| 2,138,874 | Myers | Dec. 6, 1938 |
| 2,334,263 | Hartwell | Nov. 16, 1943 |
| 2,405,716 | Schaaf | Aug. 13, 1946 |

FOREIGN PATENTS

| Number | Country | Date |
|---|---|---|
| 352,960 | Great Britain | July 14, 1931 |
| 369,400 | Great Britain | Mar. 24, 1932 |
| 483,770 | France | May 15, 1917 |
| 492,235 | France | Mar. 11, 1919 |